US010693193B2

(12) United States Patent
Dougherty et al.

(10) Patent No.: US 10,693,193 B2
(45) Date of Patent: Jun. 23, 2020

(54) BI-PLATE GRIDS FOR BATTERIES, AND SINGLE PROCESS TO CAST THE SAME

(71) Applicant: Trojan Battery Company, LLC, Santa Fe Springs, CA (US)

(72) Inventors: Thomas Dougherty, Santa Fe Springs, CA (US); Raymond Jurek, Santa Fe Springs, CA (US); Jesus Florencio Perez Lopez, Santa Fe Springs, CA (US)

(73) Assignee: TROJAN BATTERY COMPANY, LLC, Santa fe Springs, CA (US)

( * ) Notice: Subject to any disclaimer, the term of this patent is extended or adjusted under 35 U.S.C. 154(b) by 0 days.

(21) Appl. No.: 16/007,438

(22) Filed: Jun. 13, 2018

(65) Prior Publication Data
US 2019/0386345 A1   Dec. 19, 2019

(51) Int. Cl.
| | | |
|---|---|---|
| *H01M 10/18* | (2006.01) | |
| *H01M 4/73* | (2006.01) | |
| *H01M 10/12* | (2006.01) | |
| *H01M 4/84* | (2006.01) | |
| *H01M 4/02* | (2006.01) | |

(52) U.S. Cl.
CPC ............. *H01M 10/18* (2013.01); *H01M 4/73* (2013.01); *H01M 4/84* (2013.01); *H01M 10/12* (2013.01); *H01M 2004/029* (2013.01)

(58) Field of Classification Search
None
See application file for complete search history.

(56) References Cited

U.S. PATENT DOCUMENTS

| | | | |
|---|---|---|---|
| 3,819,412 A | 6/1974 | Taylor et al. | |
| 4,098,967 A | 7/1978 | Biddick et al. | |
| 4,900,643 A | 2/1990 | Eskra et al. | |
| 5,156,932 A | 10/1992 | Dougherty et al. | |
| 5,556,627 A * | 9/1996 | Lafollette | H01M 2/08 429/210 |
| 2003/0054234 A1 | 3/2003 | Zucker | |
| 2003/0072998 A1 | 4/2003 | Fredricksson et al. | |
| 2010/0009263 A1* | 1/2010 | Gerber | H01M 4/73 429/245 |
| 2012/0094182 A1* | 4/2012 | Hirose | H01M 4/73 429/241 |
| 2012/0237816 A1* | 9/2012 | Roscheisen | H01M 2/1613 429/156 |
| 2015/0140376 A1 | 5/2015 | Shaffer, II et al. | |
| 2017/0133651 A1 | 5/2017 | Dreyer et al. | |

OTHER PUBLICATIONS

International Search Report and Written Opinion dated Oct. 1, 2019 for corresponding PCT Application No. PCT/US2019/036933.

* cited by examiner

*Primary Examiner* — Wojciech Haske
(74) *Attorney, Agent, or Firm* — Duane Morris LLP (57) ABSTRACT

The present disclosure is directed to bi-polar plates for use in lead-acid batteries, and methods of making the same. The bi-polar plates of the present disclosure comprise first and second conductive plates of lead joined by a plurality of connections through a plastic substrate. The connections may be formed by welding or in the process of casting the conductive plates, resulting in connections that are chemically homogenous with the conductive plates themselves. In addition, the welding and casting processes of the present disclosure offer significant time savings in the production of bi-polar plates.

18 Claims, 7 Drawing Sheets

BI-PLATE GRIDS FOR BATTERIES, AND SINGLE PROCESS TO CAST THE SAME

INTRODUCTION

The present disclosure generally relates to methods of manufacturing bi-polar plate batteries, and the bi-polar plates and batteries produced by such methods.

BACKGROUND

Current methods of manufacturing bi-polar or bi-plate batteries use a plastic sheet that has two thinner lead sheets soldered to the surfaces on both faces. The pure lead sheet has significant sealing and lifespan issues, in addition to the lead solder process being slow, expensive, and having issues with corrosion. There is also little adhesion of the oxide onto the flat surface of the lead sheet with the current process.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In some embodiments, the present disclosure is directed to a bi-polar plate for a lead-acid battery, comprising: first and second conductive plates; and a substrate between the first and second conductive plates, the substrate having a plurality of connecting holes; wherein the first and second conductive plates are joined through each of the connecting holes without a solder filler.

In some embodiments, the present disclosure is directed to a method of producing a bi-polar plate for a lead-acid battery cell, comprising: forming a plurality of connecting holes through a substrate; arranging the substrate between first and second conductive plates; and joining the first conductive plate to the second conductive plate through each of the connecting holes without a solder filler.

In some embodiments, the present disclosure is directed to a lead-acid battery, comprising: a plurality of bi-polar plates, each of the plurality of bi-polar plates comprising: first and second conductive plates; and a substrate between the first and second conductive plates, the substrate having a plurality of connecting holes; wherein the first and second conductive plates are joined through each of the connecting holes without a solder filler.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

In some embodiments, the present disclosure is directed to a method in which pre-cast lead grids are welded together through many holes within a plastic substrate sheet to create a bi-plate. Accordingly, the lead grids and the connections through the substrate are chemically homogeneous. The precast lead grid has significantly more structure than the lead sheets currently being used, which will help the oxide hold in place and reduce the shearing effect of the oxide off the lead surface during cycling. Either a weld button can be cast on the grid for welding or extrusion welding can be used without a weld button. A combination of both methods may be used, with weld holes between 1"-6" inches apart. Furthermore, the process can offer higher speed manufacturing and the lead grids can be used in various battery constructions. Lead-acid batteries incorporating bi-polar plates of the present disclosure may find use in high-power applications and high-voltage applications (e.g., at least 24 V), such as stop-start vehicles. In addition, the grids of the present disclosure are more stable and more resistant to corrosion than full lead sheets, owing to the increased thickness of the (positive) grids.

In some embodiments, the present disclosure is directed to a method comprising casting negative and positive lead grids on both faces of a plastic substrate sheet in a single operation. The process will also cast lead through many holes within the plastic sheet connecting the negative and positive grids. Accordingly, the lead grids and the connections through the substrate between the lead grids are chemically homogeneous. The lead grids will have significantly more structure than the lead sheets currently being used, which will help the oxide hold in place and reduce the shearing effect of the oxide off the lead surface during cycling. Lead oxide expands and contracts during cycling, breaking away from the lead metal surface; using a lead metal grid structure instead provides all-around support for the oxide, thus helping hold the material in place. The grid can be cast directly onto certain plastics. Selective cooling of the plastic material prior to the casting of the lead can also be used to improve the speed of the molding and lead solidification processes. This design offers a faster manufacturing method with a lower cost and reduction in lead, compared to existing designs and methods.

In some embodiments, the present disclosure is directed to a bi-polar plate for a lead-acid battery, comprising: first and second conductive plates; and a substrate between the first and second conductive plates, the substrate having a plurality of connecting holes; wherein the first and second conductive plates are joined through each of the connecting holes without a solder filler. The first and second conductive plates each comprise lead metal.

As used herein, a "bi-polar plate" has positive and negative active materials adhered to opposite sides of a substrate with first and second conductive plates on either face of the substrate. The substrate is suitably an acid-resistant plastic sheet comprising such plastics as, but not limited to, polyolefins, acrylonitrile butadiene styrenes (ABSs), polyimides, polysulfones, or a talc-filled plastic, such as a talc-filled polyethylene or a talc-filled polyolefin. Talc-filled plastics may provide increased strength and rigidity, and talc-filled polyethylene provides increased strength and heat resistance (relative to non-talc-filled plastics) to the welding process. The plastic may be chosen to be the lowest cost that still provides suitable thermal resistance to welding and to the lead metal during the casting process, i.e., the plastic does not deform during welding or during lead casting. The thickness of the substrate is not particularly limited, and may be as thin as achievable while still maintaining structural integrity, such as during the lead-casting process. In some embodiments, the substrate may be about 0.050-inch thick.

The function of the bipolar substrate is to allow current to pass from one electrode to the other through the substrate, thereby eliminating the need for grid lugs, current straps and intercell connections. Bipolar plates can be tightly stacked against each other, with suitable electrolyte present, thus occupying less space.

As used herein, the term "about" is defined to being close to as understood by one of ordinary skill in the art. In one non-limiting embodiment, the term "about" is defined to be within 10%, preferably within 5%, more preferably within 1%, and most preferably within 0.5%.

As used herein, "connecting holes" run through the substrate, from the side facing the first conductive plate to the side facing the second conductive plate. The connecting holes through the substrate allow electron transfer from the first conductive plate to the second conductive plate over a shorter distance, with very low resistance. Bi-polar plates according to some embodiments of the present disclosure can be used to produce a higher voltage battery in a given thickness compared to conventional lead-acid batteries. According to the present disclosure, the first and second conductive plates are joined together through each of the connecting holes without a solder filler. The bi-polar plates of the present disclosure exhibit increased chemical resistance when compared to existing products made using a solder filler. In some aspects, the joining is accomplished by welding a pre-cast first conductive plate to a pre-cast second conductive plate through the connecting holes. In some aspects, the joining is accomplished by heat pressing a pre-cast first conductive plate to a pre-cast second conductive plate through the connecting holes. Pre-cast conductive plates may or may not comprise weld buttons, or small protrusions of the conductive plate material that line up with the connecting holes and also to provide a starter or stub for the welding process. If weld buttons are not used, extrusion welding may be used. In some embodiments, the joining is accomplished by simultaneously casting a first conductive plate on one side of the substrate and a second conductive plate on the other side of the substrate, if not using pre-cast conductive plates. Alternatively, a weld riveting process may be used.

In some aspects, the first and second conductive plates are welded together through each of the connecting holes. Welding may be carried out using equipment and methods known to persons of ordinary skill in the art, such as the equipment used to weld internal straps to conventional lead-acid batteries. The welding current is suitably directed through the connecting hole from a first grid to a different second grid, and not between two or more first grids. In some aspects, smaller welds are used with thinner plastic substrates. In some aspects, each of the connecting holes has a diameter of about 0.15 inch to about 0.375 inch (for individual grids of 3 inches in diameter or square). In addition, preferably, the thinner the plastic, the smaller the weld size.

In some aspects, the first and second conductive plates are connected via cast connectors through each of the connecting holes. As used herein, the term "cast connectors" refers to connections made through the connecting holes in the process of casting the first and second conductive plates onto the substrate. Therefore, the cast connectors are made of the same material as the first and second conductive plates.

In some aspects, the first conductive plate comprises a plurality of first grids and the second conductive plate comprises a plurality of second grids. The conductive plates of the present disclosure, comprising a plurality of grids, have several advantages over metal sheets or foils as conductive plates. First, the grids can be thicker, such as 2-3 times thicker than foil. Without wishing to be bound to any particular theory, it is believed that. the thicker the grid is, the longer the grid lasts, with a logarithmic relationship between thickness and longevity. Second, the holes in the grid structure are better able to hold in place the conductive paste. The conductive paste is suitably any conductive paste known in the lead-acid battery art.

Figure 1:
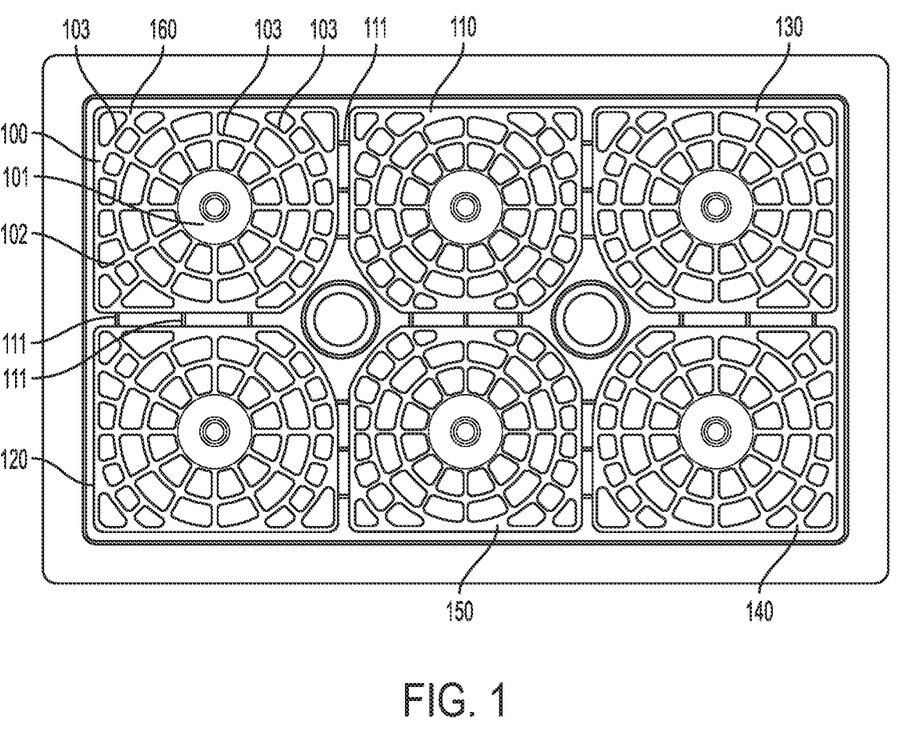
FIG. 1 shows one face of a bi-polar plate according to some embodiments of the present disclosure.

In some aspects, the plurality of first grids and the plurality of second grids are each a plurality of circular grids, as shown in FIG. 1. First conductive plate 160 comprises a plurality of first grids, i.e., first circular grids 100, 110, 120, 130, 140, and 150. First circular grids 110, 120, 130, 140, and 150 may be similar in some aspects to first circular grid 100. Each first grid may be characterized by a solid center 101, a series of mesh wires 102 projecting radially outward from the solid center 101, and a series of mesh wires 103 in concentric circles around the solid center 101 at different radii.

The solid center has a diameter of about 0.0625 inch to about 0.1875 inch and a thickness of about 0.050 inch. For individual grids of 3 inches in diameter or square the solid center of the grid would be about 0.300 to about 0.600 inches in diameter.

The grids are suitably each about 1 to about 4 inches in diameter, such as about 2 to about 3 inches, such as about 3 inches. The mesh wires suitably have a pellet size (width by thickness) of about 0.125 inch by about 0.125 inch, to about 0.5 inch by about 0.5 inch, such as about 0.25 inch by about 0.25 inch, or about 0.25 inch by about 0.5 inch, or about 0.5 inch by about 0.25 inch. Without wishing to be bound to any particular theory, it is believed that, the more wires, the higher the pellet size, but the higher the corrosion rate. Without wishing to be bound to any particular theory, it is believed that properties such as conductivity and formation capability may be lost with increasing pellet size.

The number of grids per conductive plate will depend on the size of the substrate and the diameter of the grid. The number of grids per conductive plate is suitably chosen such that the total surface area occupied by the first or second conductive plate (including any surface area in the holes trapped by the mesh wires) is less than the total surface area of that face of the substrate. In some aspects, the plurality of first grids comprises at least four metal grids and the plurality of second grids comprises at least four metal grids.

In some aspects, the plurality of first grids comprises six metal grids and the plurality of second grids comprises six metal grids.

Figure 2:
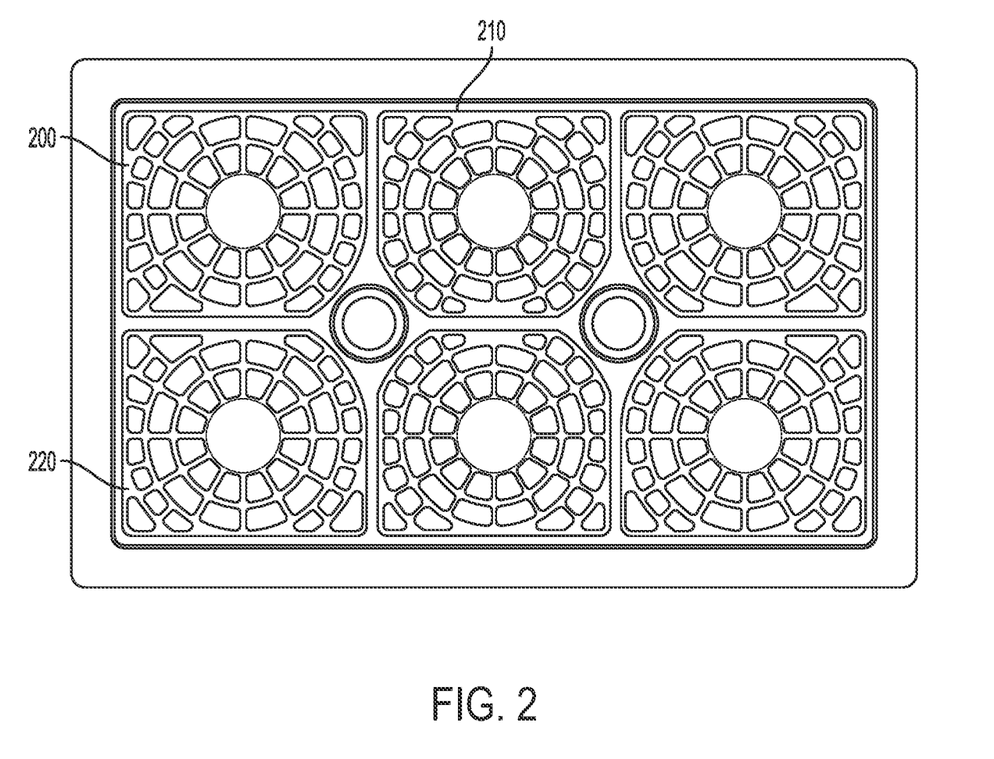
FIG. 2 shows one face of a bi-polar plate according to alternate embodiments of the present disclosure.

Each of the plurality of grids in a given conductive plate may be connected together by a series of connecting wires extending from a first grid to a second grid. As shown in FIG. 1, first grid 100 is connected to first grid 110 and first grid 120 by a series of connecting wires 111. Connecting wires 111 are suitably about 0.040 to about 0.070 inches thick. After casting first and second conductive plates onto the substrate (or placing pre-cast first and second conductive plates onto the substrate), the series of connecting wires 111 may either be retained or cut. If the series of connecting wires 111 is cut, then first grid 100 is not electrically connected to first grid 110 or first grid 120 (FIG. 2). First grids 200, 210, and 220 may be similar in some aspects to first circular grid 100. Without wishing to be bound to any particular theory, it is believed that retaining the connecting wires 111 provides an electrical connection as well as additional mechanical stability between first grids (and between second grids) during manufacture and use of the bi-polar plates.

Figure 3A:
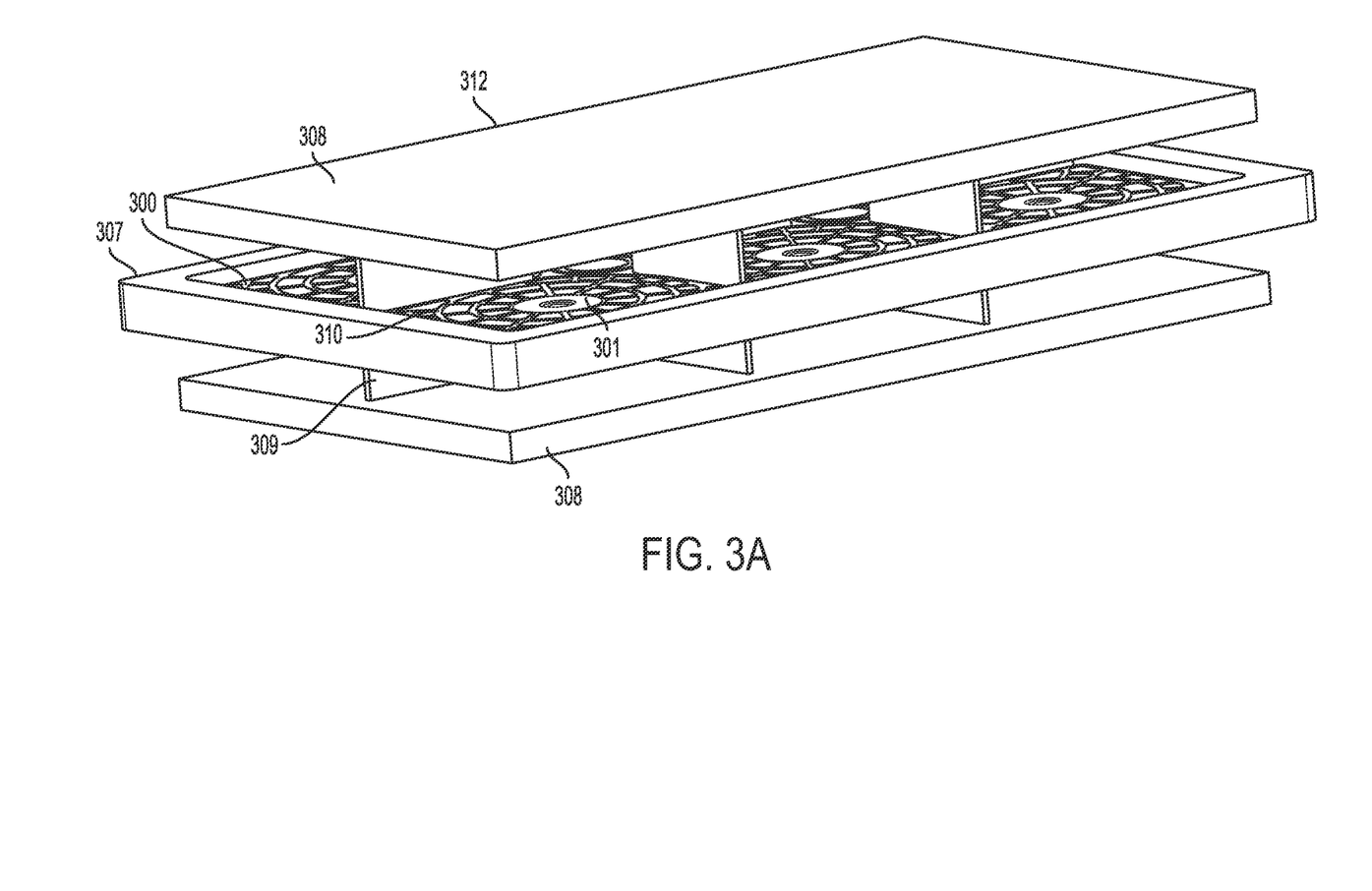
FIG. 3A shows a die for use in a method of producing a lead-acid battery according to some embodiments of the present disclosure.

The series of connecting wires may suitably be cut using one or more dies, such as dies 308 shown in FIG. 3A. In some exemplary embodiments of the die, the die is also a welding fixture, such that a user can use the die to hold in place the plate 307, cut connecting wires 311 (FIG. 3B) between, e.g., first grid 300 and first grid 310, and weld first grids 300 and 310 to different second grids (not shown) through solid center 301 in one operation. Dies 308 may be operated manually (e.g., by hand by a user) or operation may be controlled by a computer.

Figure 3B:
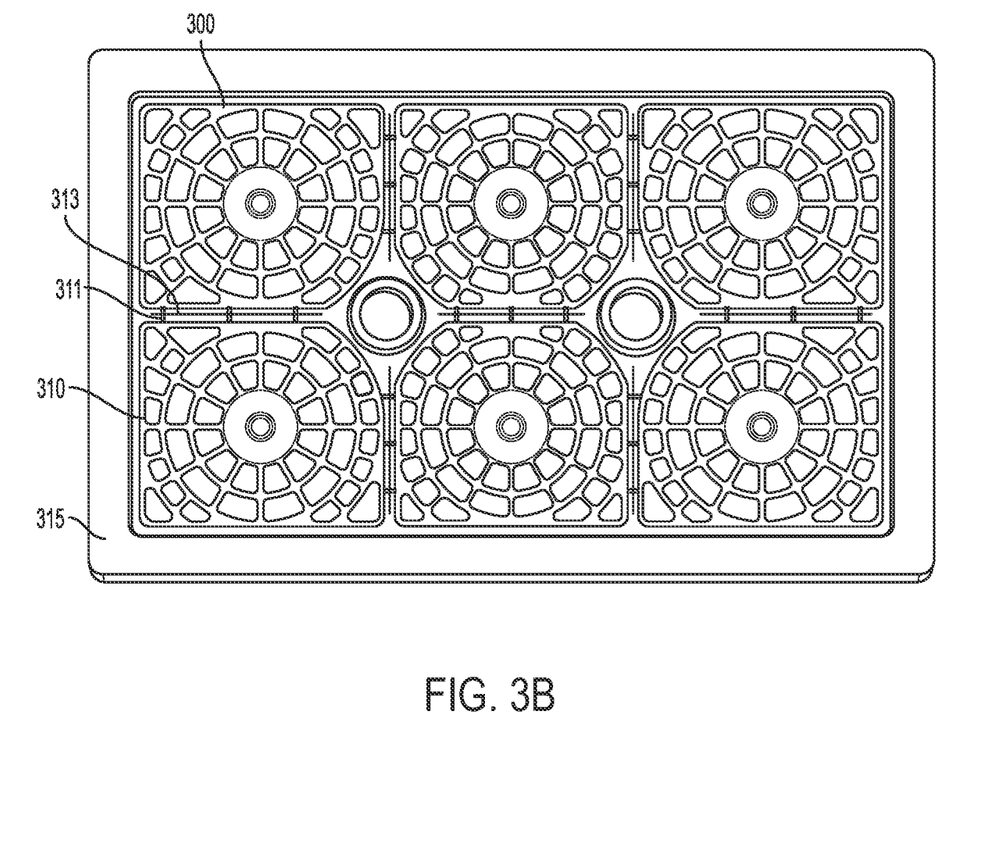
FIG. 3B shows a view of one face of a bi-polar plate upon interaction with the die shown in FIG. 3A.

Each die 308 may be operated independently of one another or in concert. Each die 308 contains a handling surface 312, for the user to grip and handle the die (either by hand or by a computer-controlled mechanism), and a series of blades 309, which are configured to cut the series of connecting wires 311 connecting, e.g., first grid 300 to first grid 310 (FIG. 3B). FIG. 3B shows cut lines 313 indicating where the blades 309 hit the substrate 315. Blades 309 may suitably shear the connecting wires 311 or pinch the connecting wires 311. Without wishing to be bound to any particular theory, it may be desirable to shear the series of connecting wires 311 because it is believed that maintaining an electrical connection between the first grids increases the welding energy needed to create the welds. If connecting wires 311 are suitably pinched to a size no larger than about one-quarter their original size.

The blades of each die 308 are suitably composed of a conducting material (such as a metal or metal alloy) or a non-conducting material (such as a ceramic), preferably a non-conducting material. Without wishing to be bound to any particular theory, a blade made of a conducting material may not be desirable to the user because, if left in place after the step of cutting the series of connecting wires 311, conducting blades may divert the current or weld energy from going through the welds or cast connectors.

In some aspects, the first grids are electrically connected together and the second grids are electrically connected together. Without wishing to be bound to any particular theory, it is believed that the connecting wires 111 provide a higher resistance pathway for electron travel than the weld or cast connector does, so it is believed that the electrons will preferentially travel through the weld or cast connector.

Figure 4:
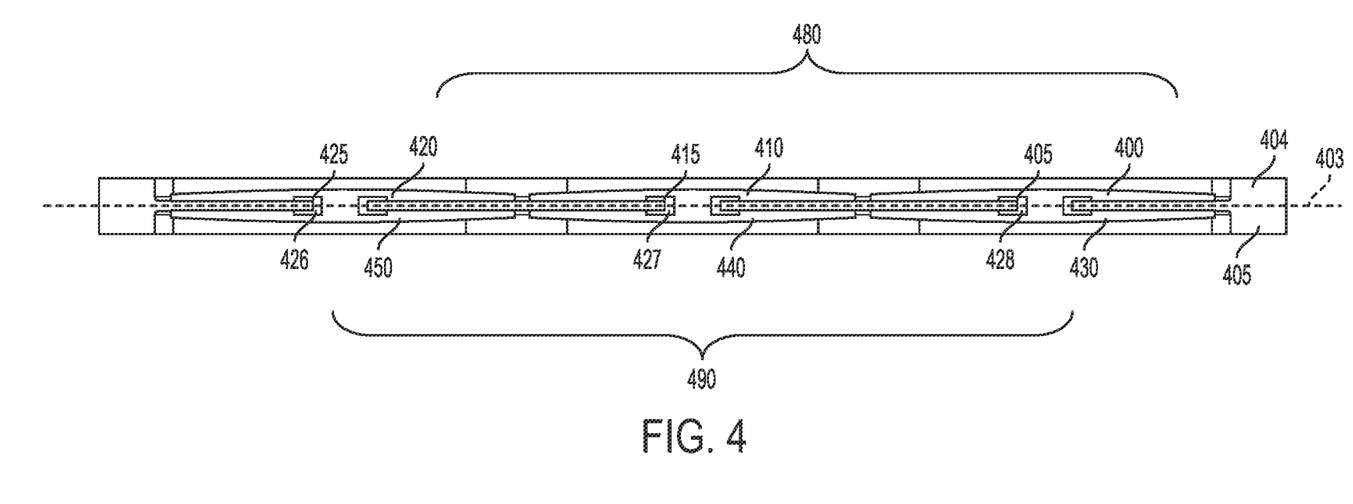
FIG. 4 shows a cross-sectional view of a bi-polar plate according to some embodiments of the present disclosure.

In some aspects, each one of the first grids is connected to a different one of the second grids through a corresponding one of the connecting holes. As shown in FIG. 4, longitudinal axis 403 divides the substrate into a first face 404, onto which first conductive plate 480 is applied or cast, and a second face 405, onto which second conductive plate 490 is applied or cast. The view shown in FIG. 4 shows that first conductive plate 480 comprises first grid 400, first grid 410, and first grid 420, and that second conductive plate 490 comprises second grid 430, second grid 440, and second grid 450. As shown in FIG. 4, each circular grid on first face 404 is connected to a different circular grid on second face 405 through the corresponding connecting hole, i.e., first grid 400 is connected to second grid 430 through corresponding connecting hole 405, first grid 410 is connected to second grid 440 through corresponding connecting hole 415, and first grid 420 is connected to second grid 450 through corresponding connecting hole 425. Each circular grid on the first face 404 of the substrate has its own weld or cast connector to a different circular grid on the second face 405 of the substrate.

Figure 5A:
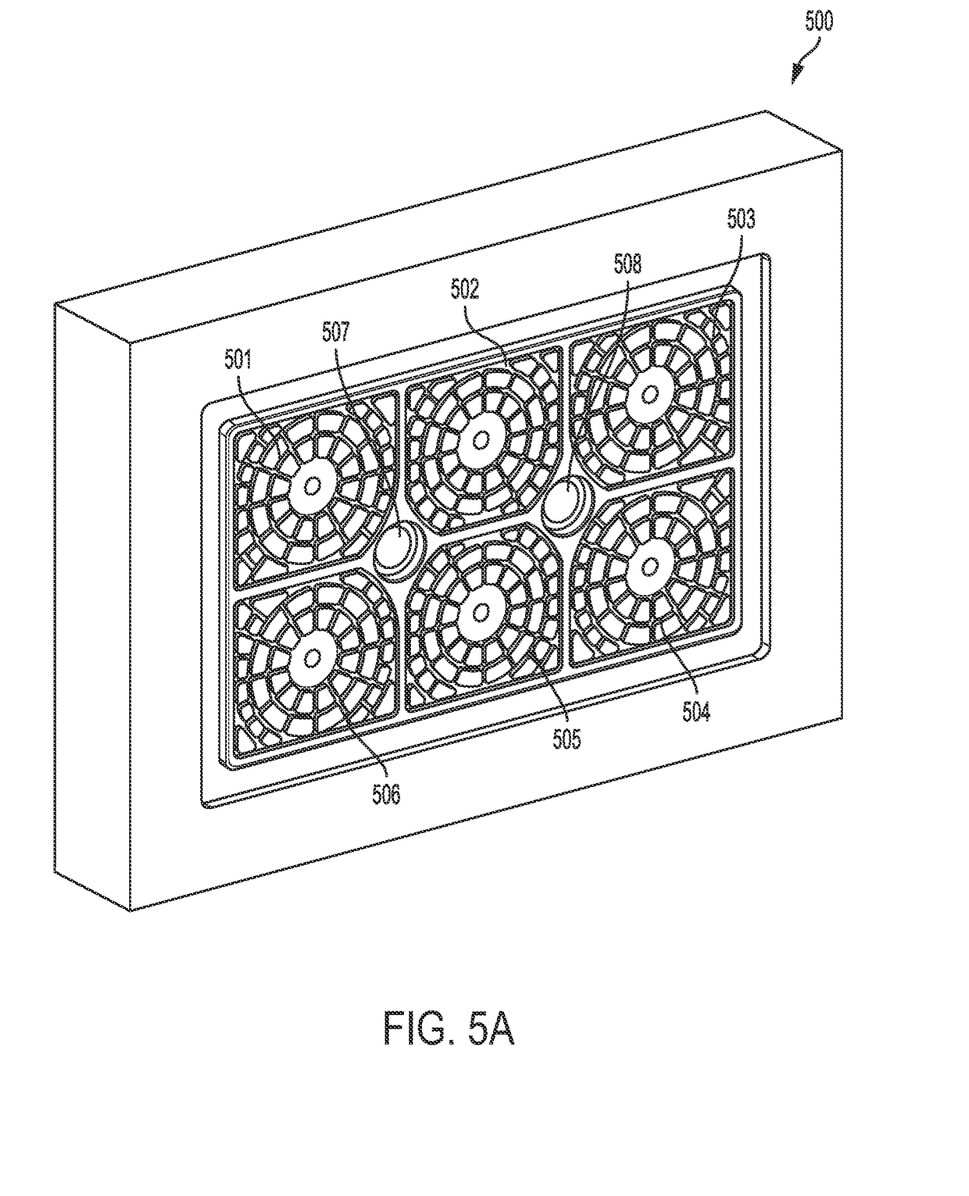
FIGS. 5A and 5B show perspective views of two halves of a mold for preparing conductive plates according to some embodiments of the present disclosure.
Figure 5B:
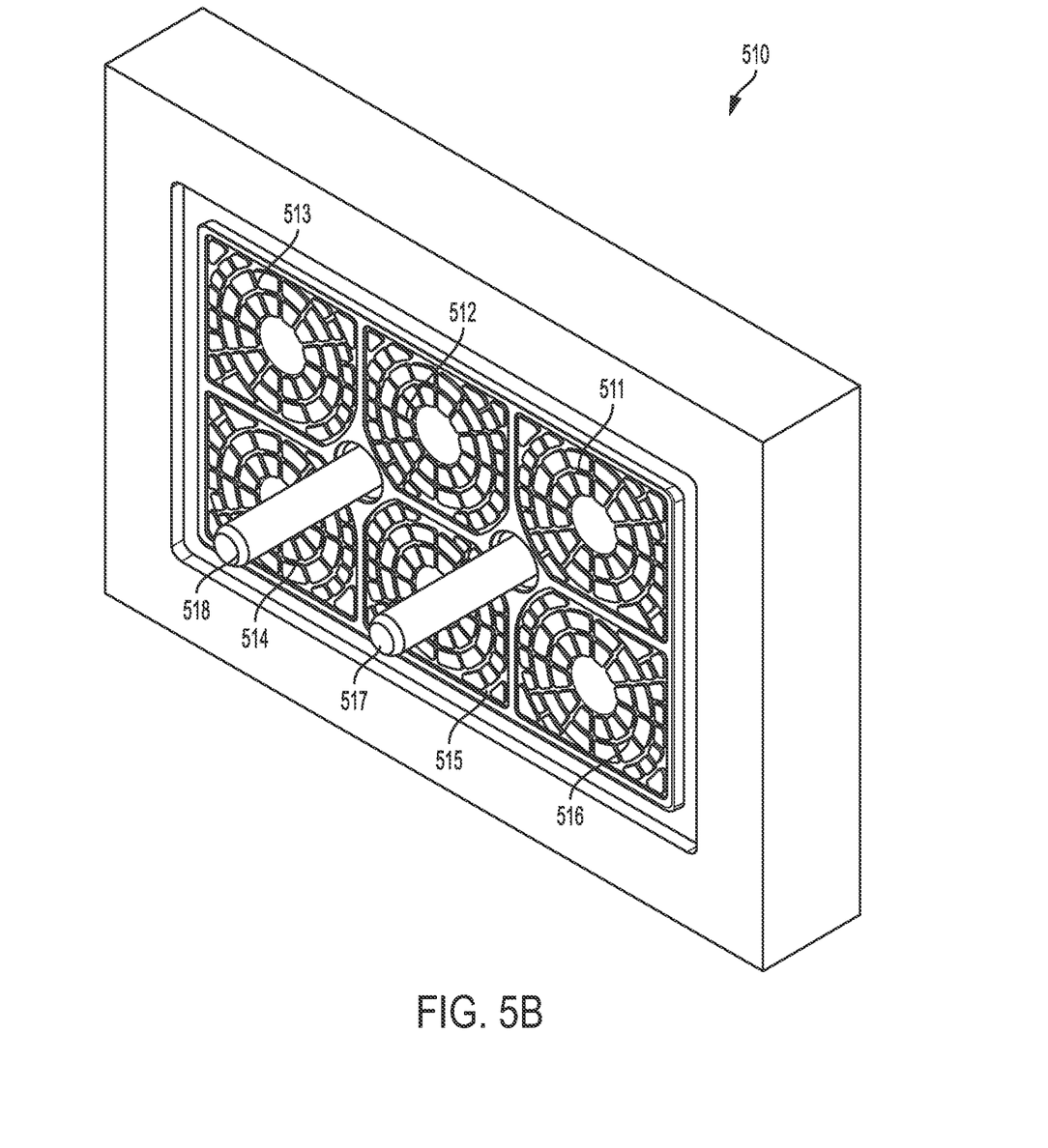

The first and second conductive plates may each be cast or pre-cast as a sheet comprising a plurality of grids. The plurality of grids are suitably manufactured by continuous casting (e.g., using the Worth-Wirtz Concast system), expanded metal grid manufacturing, or by casting with a grid mold. The plurality of grids is cast containing the series of connecting wires 111 shown in FIG. 1. Suitable apparatuses for manufacturing by expanded metal grid manufacturing include those known in the art. FIGS. 5A and 5B show right and left side views of halves of an exemplary mold used to manufacture a plurality of grids according to some embodiments of the present disclosure. First mold half 500 contains first grid molds 501-506, and second mold half 510 contains second grid molds 511-516. First mold half 500 and second mold half 510 are suitably configured to sandwich a substrate (not shown), e.g., via large holes 507 and 508 and spindles 517 and 518, for overmolding of lead unto plastic.

In some aspects, each of the plurality of first and second grids is circular in shape.

In some aspects, the first and second conductive plates are joined through each of the connecting holes by a lead connection. If pre-cast first and second conductive plates are used, the lead connections may be formed by welding or heat pressing the first and second conductive plates together through the connecting holes. If welding, the pre-cast first and second plates each individually may or may not comprise weld buttons. If one or both of the first and second plates do not comprise weld buttons, extrusion welding may be used. If first and second conductive plates are cast directly onto the substrate, the lead connections are formed in the connecting holes in the course of casting of the first and second conductive plates.

In some aspects, the substrate further comprises a secondary molding ring around each of the plurality of connecting holes, wherein the secondary molding ring comprises a different material than the first and second conductive plates and the substrate. The secondary molding ring serves as a sealing ring to keep acid (from the eventually assembled battery) from getting between the first (or second) conductive plate and the substrate. Suitable materials for the secondary molding ring include, but are not limited to, a blend of a rubber and an oil, such as high density nitriles with fluorosilicone oil. FIG. 4 shows secondary molding ring 426 in connecting hole 425, secondary molding ring 427 in connecting hole 415, and secondary molding ring 428 in connecting hole 405.

In some embodiments, the present disclosure is directed to a method of producing a bi-polar plate for a lead-acid battery cell, comprising: forming a plurality of connecting holes through a substrate; arranging the substrate between first and second conductive plates; and joining the first conductive plate to the second conductive plate through each of the connecting holes without a solder filler. All aspects described with respect to the bi-polar plate apply to the method of producing the bi-polar plate with equal force, and vice versa.

In some aspects, the first and second conductive plates are joined substantially simultaneously. In some exemplary embodiments where the first and second conductive plates are cast directly onto the substrate, a mold sandwiches the substrate, and liquid lead metal is injected into one or both of the molds or mold halves. In the process, the liquid lead metal is not only cast to form first and second conductive plates, but it also fills the connecting holes and cools to form cast connectors, joining the first and second conductive plates.

In some aspects, the first and second conductive plates are joined by welding the first and second conductive plates together through each of the connecting holes.

In some aspects, the first and second conductive plates are joined by said welding the first and seconding conductive plates together through each of the connecting holes substantially simultaneously. As used herein, "welding substantially simultaneously" refers to a welding rate of about 1 second per weld, such that welds are formed through all of the connecting holes in a substrate within about 0.01-1 seconds. Without wishing to be bound to any particular theory, the lower the resistance between the plurality of first grids, the more desirable it is to weld all of the welds substantially simultaneously.

In some aspects, the first and second conductive plates are joined by heat pressing the first and second conductive plates together through each of the connecting holes. Suitable apparatuses for heat pressing pre-cast first and conductive substrates through each of the connecting holes include those known in the art.

In some exemplary embodiments of a method of producing a bi-polar plate for a lead-acid battery cell, the first conductive plate comprises a plurality of first grids and the second conductive plate comprises a plurality of second grids.

In some exemplary embodiments of a method of producing a bi-polar plate for a lead-acid battery cell, each of the plurality of first and second grids is circular in shape.

In some exemplary embodiments of a method of producing a bi-polar plate for a lead-acid battery cell, the first and second conductive plates are joined by a lead connection through each of the connecting holes.

In some exemplary embodiments of a method of producing a bi-polar plate for a lead-acid battery cell, the method further comprises pre-casting each of the first and second conductive plates.

In some exemplary embodiments of a method of producing a bi-polar plate for a lead-acid battery cell, the arranging the substrate between the first and second conductive plates comprises applying the pre-cast first conductive plate to one side of the substrate and applying the pre-cast second conductive plate to the other side of the substrate.

In some exemplary embodiments of a method of producing a bi-polar plate for a lead-acid battery cell, the arranging the substrate between the first and second conductive plates comprises: applying a first metal mold to one side of the substrate and a second metal mold to the other side of the substrate, and injecting metal into each of the first and second metal molds to form the first and second conductive plates. In some exemplary embodiments of a method of producing a bi-polar plate for a lead-acid battery cell, the arranging the substrate between the first and second conductive plates comprises: applying a first metal mold to one side of the substrate and a second metal mold to the other side of the substrate, and injecting metal into one of the first and second metal molds to form the first and second conductive plates. For a lead-acid battery, the metal is suitably lead or a lead alloy. The lead alloy may be any lead alloy known in the art.

In some exemplary embodiments of a method of producing a bi-polar plate for a lead-acid battery cell, the method further comprises adding a secondary molding ring around each of the plurality of connecting holes, wherein the secondary molding ring comprises a different material than the first and second conductive plates and the substrate.

In some embodiments, the present disclosure is directed to a lead-acid battery, comprising: a plurality of bi-polar plates, each of the plurality of bi-polar plates comprising: first and second conductive plates; and a substrate between the first and second conductive plates, the substrate having a plurality of connecting holes; wherein the first and second conductive plates are joined through each of the connecting holes without a solder filler. All aspects described with respect to the bi-polar plate or the method of producing the bi-polar plate apply to the lead-acid battery cell with equal force, and vice versa. The bipolar plates may be assembled into a battery using any suitable methods known in the lead-acid battery art, including using any conductive paste, electrolyte, separator, or other component known in the lead-acid battery art.

In some exemplary embodiments of a lead-acid battery cell, the first and second conductive plates are welded together through each of the connecting holes.

In some exemplary embodiments of a lead-acid battery cell, the first and second conductive plates are connected via cast connectors through each of the connecting holes.

In some exemplary embodiments of a lead-acid battery cell, the first conductive plate comprises a plurality of first grids and the second conductive plates comprises a plurality of second grids.

In some exemplary embodiments of a lead-acid battery cell, the plurality of first grids comprises at least four metal grids and the plurality of second grids comprises at least four metal grids.

In some exemplary embodiments of a lead-acid battery cell, the first grids are electrically connected together and the second grids are electrically connected together.

In some exemplary embodiments of a lead-acid battery cell, each one of the first grids is connected to a different one of the second grids through a corresponding one of the holes.

In some exemplary embodiments of a lead-acid battery cell, each of the plurality of first and second grids is circular in shape.

In some aspects, the first and second conductive plates are joined through each of the connecting holes by a lead connection.

In some exemplary embodiments of a lead-acid battery cell, the substrate further comprises a secondary molding ring around each of the plurality of connecting holes, wherein the secondary molding ring comprises a different material than the first and second conductive plates and the substrate.

Aspects from the various embodiments described, as well as other known equivalents for each such aspect, can be mixed and matched by one of ordinary skill in the art to construct additional embodiments and techniques in accordance with principles of this application.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference. Moreover, nothing disclosed herein is intended to be dedicated to the public.

Further, the word "example" or "exemplary" is used herein to mean "serving as an example, instance, or illustration." Any aspect described herein as "example" or "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C.

Moreover, nothing disclosed herein is intended to be dedicated to the public regardless of whether such disclosure is explicitly recited in the claims. No claim element is to be construed under the provisions of 35 U.S.C. § 112(f), or any analogous law in any other jurisdiction, unless the element is expressly recited using the phrase "means for" or, in the case of a method claim, the element is recited using the phrase "step for."

The invention claimed is:

1. A bi-polar plate for a lead-acid battery, comprising:
   a first conductive plate, wherein the first conductive plate is a unitary plate having a plurality of first grids formed therein, and wherein each of the plurality of first grids is electrically connected to another one of the first grids by one or more wires;
   a second conductive plate, wherein the second conductive plate is a unitary plate having a plurality of second grids formed therein, and wherein each of the plurality of second grids is electrically connected to another one of the second grids by one or more wires; and
   a substrate between the first and second conductive plates, wherein the first and second conductive plates are electrically connected through the substrate.

2. The bi-polar plate of claim 1, wherein the plurality of first grids comprises at least four metal grids and the plurality of second grids comprises at least four metal grids.

3. The bi-polar plate of claim 1, wherein each of the plurality of first and second grids is circular in shape.

4. The bi-polar plate of claim 1, wherein the substrate comprises a plurality of connecting holes.

5. The bi-polar plate of claim 4, wherein each one of the first grids is connected to a different one of the second grids through a corresponding one of the connecting holes.

6. The bi-polar plate of claim 5, wherein the corresponding first grid and second grid are joined through the corresponding connecting hole by a lead connection.

7. The bi-polar plate of claim 4, wherein the substrate further comprises a secondary molding ring around each of the plurality of connecting holes, wherein the secondary molding ring comprises a different material than the first and second conductive plates and the substrate.

8. The bi-polar plate of claim 4, wherein the first and second conductive plates are connected via cast connectors through each of the connecting holes.

9. The bi-polar plate of claim 4, wherein the first and second conductive plates are joined through each of the connecting holes without a solder filler.

10. A bi-polar plate for a lead-acid battery, comprising:
    a first conductive plate, wherein the first conductive plate is a unitary plate having a plurality of first grids formed therein, and wherein each of the plurality of first grids is electrically connected to another one of the first grids;
    a second conductive plate, wherein the second conductive plate is a unitary plate having a plurality of second grids formed therein, and wherein each of the plurality of second grids is electrically connected to another one of the second grids; and
    a substrate between the first and second conductive plates, wherein each of the first grids is electrically connected to a corresponding one of the second grids through the substrate;
    wherein said each of the first grids has an electrical resistance to said another one of the first grids that is higher than the electrical resistance to said corresponding one of the second grids.

11. The bi-polar plate of claim 10, wherein the plurality of first grids comprises at least four metal grids and the plurality of second grids comprises at least four metal grids.

12. The bi-polar plate of claim 10, wherein each of the plurality of first and second grids is circular in shape.

13. The bi-polar plate of claim 10, wherein the substrate comprises a plurality of connecting holes.

14. The bi-polar plate of claim 13, wherein each one of the first grids is connected to a different one of the second grids through a corresponding one of the connecting holes.

15. The bi-polar plate of claim 14, wherein the corresponding first grid and second grid are joined through the corresponding connecting hole by a lead connection.

16. The bi-polar plate of claim 13, wherein the substrate further comprises a secondary molding ring around each of the plurality of connecting holes, wherein the secondary molding ring comprises a different material than the first and second conductive plates and the substrate.

17. The bi-polar plate of claim 13, wherein the first and second conductive plates are connected via cast connectors through each of the connecting holes.

18. The bi-polar plate of claim 13, wherein the first and second conductive plates are joined through each of the connecting holes without a solder filler.

* * * * *